United States Patent [19]
Gregson

[11] 3,930,099
[45] Dec. 30, 1975

[54] PRESSURE-SENSITIVE TRANSFER ELEMENTS

[75] Inventor: Leslie Gregson, Welwyn Garden City, England

[73] Assignee: Imperial Chemical Industries Limited, London, England

[22] Filed: Apr. 22, 1974

[21] Appl. No.: 463,125

[52] U.S. Cl. ............ 428/315; 427/146; 427/152; 427/373; 427/385; 427/407; 428/306; 428/516; 428/522
[51] Int. Cl.² B32B 27/08; B32B 27/30; B41M 5/02
[58] Field of Search ...... 117/36.4, 36.3, 36.8, 36.9, 117/76 F; 428/463, 480; 427/144–152

[56] References Cited
UNITED STATES PATENTS

| | | | |
|---|---|---|---|
| 2,943,952 | 7/1960 | Clark | 117/36 |
| 2,984,582 | 5/1961 | Newman et al. | 117/36 |
| 3,033,811 | 5/1962 | Brown et al. | 260/29.4 |
| 3,095,320 | 6/1963 | Leitner | 117/119.6 |
| 3,345,196 | 10/1967 | Goldbeck | 117/11 |
| 3,457,209 | 7/1969 | Mikofalvy | 260/29.6 |
| 3,481,761 | 12/1969 | Newman et al. | 117/36.4 |
| 3,620,802 | 11/1971 | Newman | 117/36.4 |
| 3,674,474 | 7/1972 | Kurokawa et al. | 96/1.5 |
| 3,689,301 | 9/1972 | Scott | 117/36.4 |
| 3,775,108 | 11/1973 | Arai et al. | 96/1.8 |

FOREIGN PATENTS OR APPLICATIONS 978,990  1/1965  United Kingdom

*Primary Examiner*—P. E. Willis, Jr.
*Attorney, Agent, or Firm*—Cushman, Darby & Cushman

[57] ABSTRACT

A pressure-sensitive transfer element comprising a polymeric film substrate, a transfer composition comprising a microporous polymeric sponge layer containing a pressure-releasable ink, and a cross-linked acrylic or methacrylic resin anchor coating bonding the sponge layer to the substrate. Adhesion of the sponge layer to the anchor coating layer may be improved by incorporation of an organo-metallic compound, particularly an organo-titanate.

13 Claims, 1 Drawing Figure

U.S. Patent   Dec. 30, 1975   3,930,099
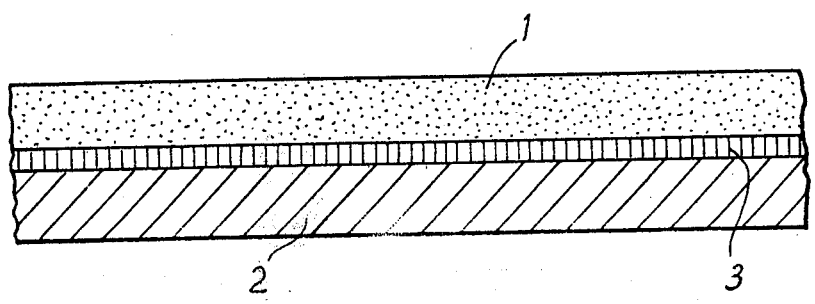

PRESSURE-SENSITIVE TRANSFER ELEMENTS

This invention relates to pressure-sensitive transfer elements, and in particular to transfer elements comprising a transfer composition bonded to a polymeric substrate layer by an intermediate anchor coating.

Pressure-sensitive transfer elements, such as carbon "papers" and typewriter ribbons, may comprise a polymeric film substrate on which is supported an ink-bearing microporous sponge, so that on the application of pressure to selected areas of the element—as, for example, by the impact of typewriter keys, ink is discharged from the impacted areas to form a corresponding image on an appropriately positioned sheet of paper, or the like. On release of the impact pressure, ink flows from the non-impacted areas of the porous sponge to replenish that exuded from the previously impacted areas.

To improve the adhesion of a microporous sponge layer to a polyolefin film substrate, it has been proposed that the polyolefin film be pretreated by effecting partial oxidation of one or both surfaces of the film by flame treatment or a corona discharge treatment, and that an intermediate coating of a cured polyurethane resin be interposed between the pretreated film surface and the subsequently applied microporous sponge layer.

In addition to providing an anchorage for the microporous sponge layer, the intermediate anchor coating layer should desirably act as a barrier to prevent migration of components of the ink medium from the microporous sponge layer into the film substrate with consequent deteriortation of the latter. For example, currently available pressure-sensitive elements may become swollen and distorted as a result, it is believed, of deleterious components migrating from the ink medium into the polymeric film substrate.

We have now devised an improved pressure-sensitive element.

Accordingly, the present invention provides a pressure-sensitive transfer element comprising a polymeric film substrate, a transfer composition comprising a microporous thermoplastic polymeric sponge layer containing a pressure-releasable ink, and an intermediate anchor coating bonding the sponge layer to the film substrate, said anchor coating comprising a cross-linked acrylic or methacrylic resin.

The present invention also provides a method of producing a pressure-sensitive transfer element comprising coating a polymeric film substrate with a solution or dispersion of a cross-linkable acrylic or methacrylic resin composition in a first volatile vehicle, evaporating the first volatile vehicle from, and effecting cross-linking of the resin composition, depositing on the cross-linked resin coating a solution or dispersion of a thermoplastic polymeric material in a second volatile vehicle, said solution or dispersion containing a pressure-releasable ink, and evaporating the second volatile vehicle to form, from the thermoplastic polymeric material, a microporous sponge layer bonded to the cross-linked coating and containing, within the pores of the sponge, the pressure-releasable ink.

Suitable polymeric substrates for the transfer elements of the present invention include films formed from synthetic, thermoplastic materials such as polymers and copolymers of 1-olefins such as ethylene, propylene, butene-1 and 4-methyl pentene-1, linear polyesters such as polyethylene terephthalate and polyethylene-1:2-diphenoxyethane-4:4'-dicarboxylate, polyamides such as polyhexamethylene adipamide, polycaprolactam, and copolymers thereof, polysulphones, and polymers and copolymers containing vinyl chloride. Polypropylene is a preferred substrate material.

The film substrates of this invention may be unoriented or may be oriented in one or both directions in the plane of the film, and if oriented in both directions, the orientation may be equal in those directions or unequal, for example with the higher degree of orientation in a preferred direction (usually the longitudinal direction, i.e. the direction in which the polymeric material is extruded and processed during the film-forming process). Preferably, the oriented film is "heat-set" before the anchor coating is applied, i.e. the dimensional stability of the film is improved by heating the film, while restrained against thermal shrinkage, to a temperature above the glass transition temperature of the polymer from which the film is formed but below the melting point thereof.

In the case of polyolefin film substrates the surface or surfaces of the film to which a resin anchor coating is to be applied should be subjected to a treatment to improve the bonding properties of that surface. This treatment may be a physical or chemical treatment which oxidises the film surface. Examples of suitable chemical treatments are to treat the surface of the film with oxidising agents such as chromic acid in sulphuric acid, or hot nitric acid, or to expose the surface to ozone. Alternatively, the surface of the film may be exposed to corona discharge (such treatment is described in British Specification No. 715,914), to ionising radiation, or to a flame for a sufficient time to cause superficial oxidation but not long enough to cause distortion of its surface. The preferred treatment, because of its effectiveness and simplicity, is to expose the surface to a high voltage electric stress accompanied by corona discharge.

The thickness of the polymeric film substrates is governed primarily by the ultimate application envisaged for a transfer element made therefrom, but should be such that the film will not stretch during processing, and will survive the repeated impacts sustained during usage of the resultant element. In general, we prefer to employ film substrates having a thickness of from 8 to 30 microns.

The cross-linkable acrylic or methacrylic resin composition employed as an intermediate anchor coating suitably comprises a copolymer of a monoethylenically unsaturated amide, or substituted derivative thereof, with acrylic and/or methacrylic acid or esters thereof.

Suitable unsaturated amides include acrylamide, methacrylamide, and derivatives thereof in which at least one of the amino hydrogen atoms is replaced by groupings such as
 —CH$_2$OH,
or
 —CH$_2$OR,
wherein R is an alkyl radical, such as a methyl, or ethyl radical.

Suitable esters for inclusion in the copolymer include alkyl acrylates and methacrylates in which the alkyl grouping contains from 1 to 4 carbon atoms, although other esters such as benzyl or cyclohexyl acrylates or methacrylates may also be employed.

Optionally, the anchor coating resin copolymer may include derivatives of acrylic or methacrylic acid other than esters. Suitable derivatives include acrylonitrile, and methacrylonitrile.

Suitably, the anchor coating resin comprises a terpolymer containing, by weight of the terpolymer, from 5 to 10 percent of a monoethylenically unsaturated amide, or a substituted derivative thereof, and from 40 to 85 percent of an alkyl acrylate, the balance comprising an alkyl methacrylate, acrylonitrile, or methacrylonitrile.

A preferred resin comprises a terpolymer containing, by weight of the terpolymer, from 5 to 10 percent of the amide, or derivative thereof, from 45 to 70 percent of an alkyl acrylate, and from 20 to 50 percent of an alkyl methacrylate.

A further preferred resin comprises a terpolymer containing, by weight of the terpolymer, from 5 to 10 percent of the amide or derivative thereof, from 75 to 85 percent of an alkyl acrylate, and from 5 to 20 percent of acrylonitrile or methacrylonitrile.

Desirably, the anchor coating composition includes a suitable cross-linking catalyst, such as ammonium chloride or ammonium thiocyanate.

In addition, the anchor coating composition preferably includes a thermosetting resin condensate, such as the condensation product of an amine, particularly melamine, with formaldehyde. If desired, the resin condensate may be alkylated.

The thermosetting resin condensate is conveniently employed in a proportion from about 10 to about 30 percent by weight of the copolymer.

A particularly suitable anchor coating composition comprises a terpolymer of acrylamide, ethylacrylate, and methylmethacrylate (5:45:50 parts by weight), and an ethylated melamine-formaldehyde condensation resin (12 percent by weight of the terpolymer). Such a composition exhibits good barrier properties, has a suitably long "pot-life," and does not evolve toxic vapours.

The anchor coating composition may be applied from a first volatile vehicle comprising an organic medium such as methylethylketone, but is conveniently and economically applied as an aqueous dispersion, the total solids content of the dispersion being suitably from 5 to 60 percent, by weight of the composition.

In practice, the anchor coating composition is applied to the film substrate by conventional coating techniques — for example, by spraying, dipping, air-knife coating, or preferably, by a gravure roller coating technique, and the applied coating is subsequently dried to cure the cross-linkable resin. Drying may be effected at ambient temperature, but in order to effect rapid cross-linking of the resin composition we prefer that the first volatile vehicle be removed by heating the coated substrate, heating being effected by conventional techniques, e.g. by radiant heaters or by passage of the coated substrate through an air oven, at a temperature which will not induce thermal shrinkage of the film substrate. Drying should be effected, in the case of an anchor coating applied as a dispersion, at a temperature sufficiently high to ensure that the applied coating will form a uniform film layer on the substrate. For example, an aqueous latex coating comprising a copolymer of acrylamide, ethylacrylate, and methylmethacrylate (5:45:50 parts by weight) and an ethylated melamine-formaldehyde condensation resin (12 percent by weight of the copolymer) should be dried at a temperature of at least 29°C. For a polypropylene substrate, drying is conveniently effected at a temperature of from about 60° to about 120°C. Desirably, drying should be effected for a period of time such that substantially all of the first volatile vehicle is evaporated prior to application of the microporous sponge layer.

The anchor coating composition should be applied in an amount such that the dried coating will provide an adequate anchorage for the subsequently applied microporous sponge layer, and will prevent disruption or swelling of the substrate by migration of components of the sponge layer or of the ink contained therein. Preferably, the dried anchor coating should have a thickness of at least 0.25 microns, a suitable coating thickness being from 0.5 to 2.5 microns.

If desired, the anchor coating composition may contain, in addition to the polymeric constituents, wetting agents, antioxidants, dyes, pigments and other conventional additives — particularly an anti-blocking agent, to prevent the anchor-coated substrate sticking to itself if wound onto a reel for storage prior to application of the microporous sponge layer. Desirably, the anti-blocking agent, if employed, should be of a non-porous nature to ensure that deleterious components from the subsequently applied ink-containing microporous sponge layer are not absorbed thereby, and attracted to the vicinity of the film substrate. Suitable, non-porous, anti-blocking agents include glass ballotini and precipitated silica, having a weight average particle size of from 0.01 to 50 microns, preferably from 0.5 to 10 microns.

In particular, we have observed that the adhesion of the microporous sponge layer to the anchor coating layer is improved by the presence of an organo-compound of a metal of Group IV of the Periodic Table of the Elements, and particularly a compound of a metal of Group IVB of the Periodic Table viz titanium, zirconium and hafnium.

The Periodic Table of the Elements referred to herein is that depicted at page B-3 of "The Handbook of Chemistry and Physics," Forty ninth edition, 1968–1969, published by The Chemical Rubber Company of Cleveland, Ohio.

Preferably, the adhesion improver is water-soluble to facilitate incorporation of the improver into the anchor coating resin, which is conveniently deposited onto the substrate from an aqueous latex, and organotitanates and organo-zirconates are particularly suitable water-soluble adhesion improvers. The organo-titanate or -zirconate is conveniently derived by esterification with an alkanol containing from 1 to 8 carbon atoms in the molecule, for example — methanol, ethanol, isopropanol, or n-butanol, the alkanol being optionally substituted by one or more groups — for example hydroxyl groups. A preferred adhesion improver is tetra-n-butyl titanate.

Suitable organo-metallic compounds also include those derived by esterification with alkanolamines, such as mono-, di-, or triethanolamine, or substituted derivatives thereof. Triethanolamine titanate is a particularly useful adhesion improver.

If desired, simple mixed esters may be employed as adhesion improvers — for example, monomethoxytriethoxy titanium. Alternatively, mixed esters derived from an alkanolamine and one or more alkanols may be employed.

Other suitable water-soluble organo-metallic adhesion improvers include chelate compounds, such as those derived from β-diketones — for example, titanium acetylacetonate.

The adhesion improver is conveniently included in the resin to be applied as anchor coating to the polymeric film substrate, but may, if desired, be applied as a solution coating onto a previously deposited, and dried, anchor coating layer. Alternatively, the adhesion improver may be incorporated into the microporous sponge layer of the transfer element.

The amount of adhesion improver to be employed depends inter alia on the type of film selected as substrate, and the particular compositions from which the anchor coating layer and the microporous sponge layer of the element are to be formed, but, in general, we find that an improvement in adhesion is observed when the amount of adhesion improver constitutes about 0.25 percent by weight of the solids content of the anchor coating resin. The upper limit of the amount of adhesion improver employed is dictated inter alia by the required degree of improvement in adhesion, and the cost of the improver relative to that of the other components of the transfer element. In general, the amount of adhesion improver need not exceed 25 percent by weight of the solids content of the anchor coating resin, and should preferably be in a range of from 1 to 15 percent by weight of the solids content of the anchor coating resin.

The thermoplastic microporous sponge layer should adhere securely to the film substrate, should not fracture or become detached therefrom when subjected to the impact of typewriter keys or the pressure applied by a writing implement, and is suitably formed from any of the polymeric materials conventionally employed for this purpose in the manfacture of pressure-sensitive transfer elements.

Thus, polyesters, polysulphones, or polyamides, as hereinbefore described as being suitable for use as a film substrate, may be employed. Other useful materials include cellulosic esters, and vinyl polymers including acrylic, methacrylic and styrene polymers and copolymers. Preferred materials include polymethyl methacrylate, polyvinyl chloride, and vinyl acetate-vinyl chloride copolymers.

The solution or dispersion of the thermoplastic polymeric material in a second volatile vehicle is conveniently applied to the anchor-coated film substrate by conventional coating techniques — for example, by means of a wire-wound rod or by a gravure roller technique, the volatile vehicle being subsequently evaporated by conventional drying techniques — for example, by passage of the coated film through an air-oven, to form a microporous sponge layer of the desired thickness, the latter being conveniently from about 10 to 50 microns, preferably from about 15 to 30 microns.

Desirably the second volatile vehicle should be such as will not substantially dissolve or disrupt the cross-linked anchor coating layer, and which can be readily evaporated at a sufficiently low temperature to avoid excessive thermal shrinkage of the film substrate. Vehicles suitable for this purpose include ethyl acetate, methylethylketone, and toluene.

Any of the conventional inks incorporated in commercially available transfer elements of the pressure-releasable type, may be employed in the transfer elements of the present invention. Conveniently, the ink comprises a pigment, such as carbon black, suspended in an oleaginous vehicle — for example, an alkyl stearate, mineral oil, or refined rapeseed oil. The ink, preferably in the form of a viscous paste, is incorporated into the solution or dispersion of the thermoplastic polymeric material before the latter is applied to the anchor-coated substrate and dried to form a microporous sponge layer, the pores of which are replete with ink available for release on the application of pressure thereto.

Desirably, the ink should be "inert" with respect to the polymeric material constituting the microporous sponge layer, i.e. to ensure release of the ink on impact, the ink should not form a solution with the polymer sponge layer.

The invention is illustrated by reference to the accompanying drawing which depicts a simplified schematic cross-sectional elevation of a portion of a pressure-sensitive transfer element having a microporous, ink-impregnated, sponge layer 1 securely adhered to a biaxially oriented polypropylene film substrate 2 by means of an intermediate anchor coating layer 3 of a cross-linked (meth)acrylic resin.

The invention is further illustrated by reference to the following Examples.

EXAMPLE 1

A biaxially oriented polypropylene film of 20 microns thickness was subjected, by means of a Lepel High Frequency Spark Generator (model 6), to a corona discharge treatment to improve the adhesion properties of the film surface, and to the thus treated surface was applied, by a gravure roller coating technique, an aqueous latex having the following composition by weight:

| | |
|---|---|
| "Primal" AC-201 | 15 parts |
| Ammonium Chloride Catalyst | 0.14 parts |
| Water | 30 parts |

"Primal" AC-201 is a proprietary product available from the Rohm & Haas Company, and is believed to comprise an aqueous dispersion (46 percent solids by weight) of a copolymer of acrylamide, ethylacrylate and methylmethacrylate (5, 45, 50 percent by weight) together with 12 percent by weight, based on the weight of the copolymer, of ethylated melamine-formaldehyde.

The coated film substrate was dried in an air oven at a temperature of 75°C for a period of 15 seconds, the thickness of the dried coating being approximately 1 micron (coat weight, approximately 1 g/m$^2$). On to the dried coating was then deposited by means of a wire-wound rod, a dispersion of the following composition:

| | |
|---|---|
| Viscous pigment composition | 25 parts |
| Vinyl acetate-vinyl chloride copolymer | 10 parts |
| Methylethylketone | 40 parts |
| Toluene | 20 parts | which, after evaporation of the solvent in an air oven at a temperature of 75°C, provided a microporous ink-filled layer some 20 microns in thickness (coat weight, approximately 20 g/m$^2$). The pigment composition contained carbon black pigment and an oily vehicle in a ratio of approximately 1:2 by weight.

The microporous sponge layer adhered securely to the anchor-coated film substrate to form a satisfactory transfer element.

To assess the barrier properties of the anchor coating layer, strips of the transfer element, each 25 mm × 100 mm, lightly sandwiched between two sheets of polyethylene terephthalate film (each 50 microns thick) to maintain the strips in a flat state while permitting expansion thereof, were stored at room temperature, and the percentage increase in length of the strips measured at varying intervals of time.

Results obtained are illustrated in the accompanying table, each "day" representing a period of 24 hours.

TABLE

| Anchor Coating | % Increase in length after storage for: | | | | |
|---|---|---|---|---|---|
| | 4 days | 7 days | 11 days | 17 days | 32 days |
| "Primal" AC-201 | .01 | .02 | .02 | .05 | .06 |

EXAMPLE 2

For comparison purposes, transfer elements identical to that of Example 1 were prepared, except that either no anchor coating was employed, or a polyurethane anchor coating, of similar thickness and coat weight, comprising "Daltosec" 1350 (supplied by Imperial Chemical Industries Limited) was employed.

Results obtained are illustrated in the accompanying table, each day representing a period of 24 hours.

TABLE

| Anchor Coating | % Increase in length after storage for: | | | | |
|---|---|---|---|---|---|
| | 4days | 7days | 11days | 17days | 32days |
| "Daltosec" 1350 | .01 | .01 | .01 | .05 | .10 |
| None | .26 | .59 | .73 | .81 | 1.10 |

The superior resistance to swelling, after prolonged storage, of transfer elements prepared according to the present invention is evident from a comparison of the data obtained in Example 1 and 2.

EXAMPLE 3

A polypropylene film based transfer element was prepared by the method of Example 1, except that the Primal AC-201 anchor composition additionally contained, as anti-blocking agent, 5 percent by weight based on the total solids content of the composition, of non-porous, precipitated silica having a weight average particle size distribution between 0.5 and 50 microns.

The adhesion and barrier properties of the anchor coating were not adversely affected by the presence of the anti-blocking agent.

EXAMPLE 4

To illustrate the improved "pot-life" of the anchor coating compositions of the present invention, the procedure of Example 1 was repeated using Primal compositions which had been stored at ambient temperature, and 65 percent relative humidity, for varying periods of time. Transfer elements anchor coated with Primal compositions which had been stored under these conditions for 3 days (72 hours) exhibited no deterioration in adhesion between the film substrate and microporous sponge layer, and were acceptable in every way.

EXAMPLE 5

For comparison purposes, "Daltosec" 1350 compositions were stored under identical conditions to those of Example 4. After only 12 hours, the compositions began to gel and could not then be employed in the production of transfer elements.

EXAMPLE 6

A polypropylene film-based transfer element was prepared by the method of Example 1, except that the Primal AC-201 anchor coating composition was replaced by an aqueous latex having the following composition by weight:

| | |
|---|---|
| "Primal" E32 | 15 parts |
| Ammonium Chloride Catalyst | 0.14 parts |
| Water | 30 parts |

"Primal" E32 is a proprietary product supplied by the Rohm & Haas Company, and is believed to comprise an aqueous dispersion (46 percent solids by weight) of a terpolymer of ethylacrylate (75–85 percent wt) acrylonitrile (5–10 percent wt) and a partially methylol-substituted acrylamide or methacrylamide (5–10 percent wt). It will be appreciated that the foregoing analysis is intended to provide only an approximate indication of the chemical composition of the terpolymer.

The coated film substrate was dried, and provided with a pigmented microporous sponge layer as described in Example 1, and the adhesion of the sponge layer to the anchor-coated substrate of the transfer element was assessed by making up to 25 successive carbon copies from a sheet (approximately 120 × 60 mm) of the transfer element, using an electric typewriter to ensure reproducibility of impact pressure throughout the test, and ensuring that the type characters were repeatedly applied to the same region of the transfer sheet. Both the transfer sheet and the sheets of paper on which the carbon copies had been formed were then examined, and the amount of sponge removed from the transfer element during the test assessed by visual inspection.

Averaging the results of adhesion tests on several transfer elements obtained by the method of this Example, it was observed that up to 20 successive carbon copies could be prepared from a given transfer sheet without significant removal of sponge layer from the sheet. When the number of successive carbon copies prepared from a given transfer sheet was from 20 to 25, the average area of individual specks of sponge removed was less than 0.3 mm$^2$. This is a perfectly acceptable performance, a transfer element being rejected only when the area of individual specks of sponge removed exceeds 1 mm$^2$ in less than 25 successive impacts.

The sponge layer could, however, be scratched off the substrate by drawing a finger nail across the sponge surface.

EXAMPLE 7

The procedure of Example 6 was repeated, except that the Primal E32 composition was replaced by an aqueous latex having the following composition by weight:

| | |
|---|---|
| "Primal" E358 | 15 parts |
| Ammonium Chloride Catalyst | 0.14 parts |
| Water | 45 parts |

"Primal" E358 is a proprietary product available from the Rohm & Haas Company, and is believed to comprise an aqueous dispersion (60 percent solids by weight) of a terpolymer of substantially the same chemical composition as that of Primal E32.

Adhesion test results were identical to those of Example 6.

EXAMPLE 8

The procedure of Example 6 was repeated, except that the Primal E32 composition was replaced by an aqueous latex having the following composition by weight:

| "Primal" HA12 | 15 parts |
| Ammonium Chloride Catalyst | 0.14 parts |
| Water | 30 parts |

"Primal" HA12 is a proprietary product supplied by the Rohm & Haas Company, and is believed to comprise an aqueous dispersion (45 percent solids by weight) of a terpolymer of ethylacrylate (60–70 percent wt), methylmethacrylate (25–35 percent wt), and a partially methylol-substituted acrylamide or methacrylamide (5–10 percent wt).

Adhesion test results were slightly inferior to those of Example 6, but were still perfectly acceptable, the average area of individual specks of sponge removed from a given transfer sheet being of the order of 0.5 mm$^2$ after between 20 and 25 successive impacts.

EXAMPLE 9

For comparison purposes the procedure of Example 6 was repeated, except that the Primal E32 composition was replaced by a solution of 15 parts by weight of a melamine-formaldehyde (1:6.1) resin (53 percent solids by weight) in 38 parts by weight of methylethylketone, the solution containing 3 percent by weight of the resin solids of a sulphuric acid catalyst.

After less than 10 carbon copies had been prepared during the adhesion test, specks of sponge having individual areas of up to 6 mm$^2$ became detached from the anchor-coated substrate.

EXAMPLE 10

The procedure of Example 6 was repeated except that, as anchor coating, a resin of the following composition was employed:

| "Primal" E32 | 13.5 parts |
| Triethanolamine titanate | 1.5 parts |
| Ammonium Chloride Catalyst | 0.14 parts |
| Water | 45 parts |

The resultant transfer element exhibited similar behaviour to that of Example 6 when subjected to the typewriter adhesion test, but, in addition, the sponge layer could not be separated from the anchor-coated substrate by scratching with a finger nail. The presence of the triethanolamine titanate had therefore improved the adhesion between the sponge and anchor coating layers.

EXAMPLE 11

The procedure of Example 10 was repeated except that the concentration of triethanolamine titanate was reduced from 1.5 to 0.75 parts. The resultant transfer element exhibited similar adhesion and scratch resistance as that of Example 10.

EXAMPLE 12

To the surface of a non-discharge-treated, biaxially oriented polyethylene terephthalate film of 12 microns thickness was applied, by a gravure roller coating technique, a latex having the following composition by weight:

| "Primal" E32 | 15 parts |
| Titanium Acetylacetonate | 1 part |
| Water | 3.5 parts |
| Industrial Methylated Spirits (68 op) | 28 parts |

No catalyst was present in the latex.

The coated film substrate was dried in an air oven at a temperature of 75°C for a period of 15 seconds, the thickness of the dried coating being approximately 1 micron (coat weight, approximately 1 g/m$^2$). Onto the dried coating was then deposited by means of a wirewound rod, a dispersion of the following composition:

| Viscous pigment composition | 25 parts |
| Vinyl acetate-vinyl chloride copolymer | 10 parts |
| Methylethylketone | 40 parts |
| Toluene | 20 parts | which, after evaporation of the solvent in an air oven at a temperature of 75°C, provided a microporous inkfilled layer some 20 microns in thickness (coat weight, approximately 20 g/m$^2$). The pigment composition contained carbon black pigment and an oily vehicle in a ratio of approximately 1:2 by weight.

The microporous sponge layer adhered securely to the anchor-coated substrate, to form a satisfactory transfer element, and could not be separated therefrom by scratching with a finger nail.

EXAMPLE 13

The procedure of Example 12 was repeated except that as substrate was employed an unoriented, non-discharge-treated film of polyhexamethylene adipamide (Nylon 66) of 70 microns thickness. The resultant transfer element was satisfactory in every way, and the sponge layer could not be separated from the anchor-coated substrate by scratchinig with a finger nail.

I claim:
1. A pressure-sensitive transfer element comprising a polymeric film substrate having two surfaces; a transfer composition comprising a microporous thermoplastic polymeric sponge layer containing a pressure-releasable ink; and an intermediate anchor coating adhered to one of said surfaces and to said sponge layer to bond the transfer composition to said film substrate, wherein said anchor coating comprises a cross-linked acrylic or methacrylic acid or esters thereof resin.

2. An element according to claim 1 wherein the anchor coating resin comprises a copolymer of (a) acrylamide, methacrylamide or derivatives thereof in which at least one of the amino hydrogen atoms is replaced by —CH$_2$OH or —CH$_2$OR where R is methyl or ethyl with (b) acrylic and/or methacrylic acid, or an ester thereof.

3. An element according to claim 1 wherein the anchor coating resin comprises a terpolymer of (a) an alkyl acrylate, (b) acrylamide or methacrylamide, or a substituted derivative thereof in which at least one of the hydrogen atoms of the nitrogen atom is replaced by —CH$_2$OH or —CH$_2$OR where R is methyl or ethyl, and (c) an alkyl methacrylate, acrylonitrile, or methacrylonitrile.

4. An element according to claim 2 wherein a thermosetting resin condensate which is a condensation produce of an amine with formaldehyde is present in the anchor coating resin.

5. An element according to claim 4 wherein the anchor coating resin comprises (a) a terpolymer containing, by weight of the terpolymer, 5 percent of acrylamide, 45 percent of ethylacrylate, and 50 percent of methylmethacrylate, together with (b) 12 percent by weight of the terpolymer of an ethylated melamine-formaldehyde condensation resin.

6. An element according to claim 1 comprising, as adhesion promoter, an organo-derivative of a metal of Group IV B of the Periodic Table.

7. An element according to claim 1 wherein the substrate is a polyolefin film.

8. A method of producing a pressure-sensitive transfer element comprising coating a surface of a polymeric film substrate with a solution or dispersion of a cross-linkable acrylic or methacrylic resin composition in a first volatile vehicle, heating the coated film to evaporate the first volatile vehicle from, and to effect cross-linking of, the resin composition, depositing on the cross-linked resin coating a solution or dispersion of a thermoplastic polymeric material in a second volatile vehicle, said solution or dispersion containing a pressure-releasable ink, and evaporating the second volatile vehicle to form, from the thermoplastic polymeric material, a microporous sponge layer bonded to the cross-linked coating and containing, within the pores of the sponge, the pressure-releasable ink.

9. A method according to claim 8 wherein the cross-linkable resin composition is applied to the substrate from an aqueous dispersion.

10. A method according to claim 8 wherein evaporation of the first vehicle is effected by heating the coated substrate to a temperature at which the applied coating forms a uniform film layer on the substrate.

11. A method according to claim 8 wherein the second volatile vehicle is selected from the group consisting of ethyl acetate, methylethylketone, and toluene.

12. A method according to claim 8 wherein the ink comprises a viscous paste of a pigment suspended in an oleaginous vehicle.

13. An element according to claim 6, wherein said metal is titanium, zirconium or hafnium.

* * * * *

UNITED STATES PATENT OFFICE
CERTIFICATE OF CORRECTION

Patent No. 3,930,099　　　　　　　　　Dated December 30, 1975

Inventor(s) Leslie Gregson

It is certified that error appears in the above-identified patent and that said Letters Patent are hereby corrected as shown below:

IN THE HEADING:

After "[22] Filed: Apr. 22, 1974" insert:

--[30] Foreign Application Priority Data

May 18, 1973　　Great Britain　　23780/73
　　　Dec. 21, 1973　　Great Britain　　59339/73
　　　Feb. 7, 1974　　Great Britain　　5639/74 --

IN THE SPECIFICATION:

Column 5, line 34, delete "manfacture" and substitute
　　　　--manufacture-- therefor.

IN THE CLAIMS:

Claim 3, line 5 (column 10), delete "hydrogen atoms of
　　　　the nitrogen atom" and substitute therefor --amino
　　　　hydrogen atoms--.

Claim 4, line 3 (column 11), delete "produce" and
　　　　substitute therefor --product--.

Signed and Sealed this twenty-fifth Day of May 1976

[SEAL]

Attest:

RUTH C. MASON　　　　　　　　　C. MARSHALL DANN
*Attesting Officer*　　　　　　　*Commissioner of Patents and Trademarks*